(12) United States Patent
Pfaff et al.

(10) Patent No.: US 6,357,868 B1
(45) Date of Patent: Mar. 19, 2002

(54) METHOD OF DECORATING HARD MATERIALS

(75) Inventors: Peter Pfaff, Kronberg; Maurizio Ragnetti, Mainz-Kostheim, both of (DE)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/568,960

(22) Filed: May 11, 2000

(30) Foreign Application Priority Data

May 12, 1999 (DE) .......................... 199 21 925

(51) Int. Cl.⁷ ............................................. G01D 11/00
(52) U.S. Cl. .......................... 347/99; 347/100; 347/101
(58) Field of Search .................... 347/99, 100, 101, 347/105

(56) References Cited

U.S. PATENT DOCUMENTS

| | | | |
|---|---|---|---|
| 4,892,847 A | * | 1/1990 | Reinherz ..................... 501/14 |
| 5,037,475 A | * | 8/1991 | Chida et al. ................. 106/403 |
| 5,467,112 A | * | 11/1995 | Mitani ......................... 347/88 |

* cited by examiner

*Primary Examiner*—John Barlow
*Assistant Examiner*—Manish S. Shah
(74) *Attorney, Agent, or Firm*—Wenderoth, Lind & Ponack, L.L.P.

(57) ABSTRACT

The invention relates to a method of decorating hard materials, especially materials which can be fired for the purpose of decoration, by means of direct or indirect printing. Printing is carried out by means of inkjet technology. According to the invention, a colour paste containing at least 30 wt. % inorganic solids, such as pigments and glass frits, and a thermoplastic medium having a melting point of at least 30° C. is applied to the surface to be decorated by means of a heatable inkjet print head, which preferably additionally has a device for circulating the molten colour paste.

15 Claims, 1 Drawing Sheet

METHOD OF DECORATING HARD MATERIALS

DESCRIPTION

Figure 1:
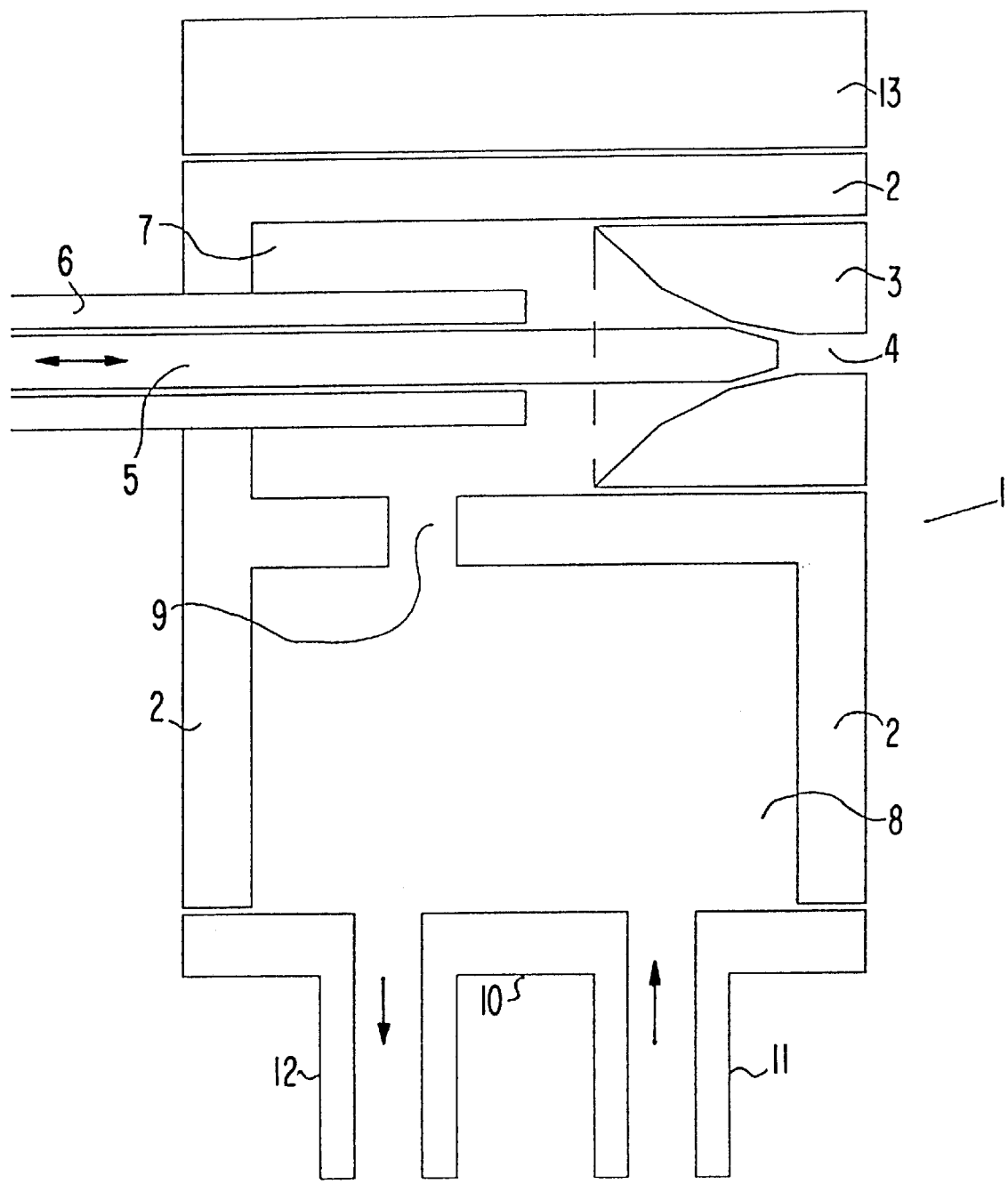

The invention relates to a method of decorating the surface of hard materials, especially materials which can be fired for the purpose of decoration, by direct or indirect printing using a colour paste containing a pigment and a thermoplastic medium (thermoplastic colour paste), the colour paste being printed onto the material to be decorated or onto a transfer material by means of inkjet technology. The method is directed especially towards the decoration of surfaces of glass, porcelain, enamel and other ceramic surfaces.

The production of decorations by printing directly or indirectly on an object to be decorated, including paper, metals, plastics, glass, porcelain, enamel and other ceramic materials, using pigmented colour pastes is known per se. In the case of the decoration of materials which can be fired for the purpose of decoration, such as glass, porcelain and other fired, biscuit-fired or unfired ceramic articles, application of the decoration to the surface to be decorated is followed by firing at from 500 to 1400° C., whereby the decoration is fixed and, optionally, a partially fired or unfired article is also glazed. Although inkjet technology, a digital printing process, has become widely accepted in conventional printers for the office sector as well as in graphic technology, it has not yet been possible to use inkjet technology successfully for the decoration of ceramic materials.

In the inkjet process, droplets of colour, or ink, under the control of a digital data store, are applied pointwise to the material to be printed. The drops can be produced continuously or discontinuously. An overview of inkjet technology is given by David H. Fishman in American Inkmaker/June 1997, pages 36–39. In conventional inkjet printing processes, the printing inks used are organic colour solutions having a very low viscosity—inkjet inks having a viscosity in the range of from 1 to 10 mPa·s are usual. Although inkjet inks may also contain pigments, especially micropigments, in small amounts, it is then difficult to maintain the required low viscosity. The use of inorganic pigments and especially inks having a high content of inorganic pigments leads to problems in the inkjet printer because the specifically heavy pigments settle out readily. It is also known to use colour pencils in wax form instead of low-viscosity colours ("solid inkjet"). Such colour pencils in wax form also contain as the colouring component organic colourings or pigments dissolved therein having a density which is close to that of the wax surrounding them, generally, therefore, organic pigments such as carbon black, settling out of the pigments and hence problems with the functioning of the inkjet printer thus largely being avoided.

From WO 97/42040 there are known transfers, the decorative layer of which is applied by means of an inkjet printer. Single-colour or multi-colour inkjet printers may be used therefor. In addition to the conventional aqueous colour systems for inkjet printers, that process also uses so-called "solid inks", that is to say systems of colours or pigments dispersed in a wax-like medium. That document gives no indication of whether the pigments are organic or inorganic pigments. That document does not indicate that the transfers can be applied to ceramic articles and the decoration can subsequently be fixed by decorative firing. This, as well as the fact that, to the knowledge of the inventors of the present Application, commercially available solid inks contain substantially no inorganic pigments, are indications that the pigments according to WO 97/42040 are substantially organic pigments and not inorganic pigments.

Attempts at printing ceramics colours by the inkjet process and hence making the inkjet process available also for decorating ceramic articles, such as glass, enamel and porcelain, have hitherto always failed owing to the pronounced tendency of the specifically heavy and coarse colour powders to form a sediment. The specific gravity of overglaze and glass colours is from 3.5 to 6.0 kg/l, and the mean fineness of grain of those products is from 3 to 5 $\mu$m. Those products settle out from aqueous or alcoholic suspensions having the conventional inkjet processing viscosity within a few seconds to the extent of in some cases 50%. Such suspensions would rapidly lead to blocking of the print nozzles and of the entire inkjet printing apparatus. Liquid colour pastes having a substantially higher viscosity, for example 5000 mPa·s, such as are used in screen printing for decorating glass, tend to separate and must be stirred again after standing for 15 minutes.

The object of the present invention is to provide a method by which colour pastes having a high content of inorganic pigments and/or ceramics decorative colours can be printed by inkjet technology. A further object is to decorate materials which can be fired for the purpose of decoration, such as glass, enamel, porcelain and other ceramic materials, using colour pastes containing ceramics decorative colours and using an inkjet process, the decoration being applied by direct or indirect printing to the material to be decorated. A further object consists in printing by means of inkjet colour pastes having a content of over 50 wt. % inorganic materials, especially inorganic pigments and glass flux. These and other objects which will become apparent from the description are achieved by the method according to the invention.

A method of decorating hard materials, especially materials which can be fired for the purpose of decoration, has been found, which method comprises applying to a surface of the material to be decorated a decorative layer based on a colour paste containing a pigment and a thermoplastic medium (thermoplastic colour paste) by means of direct or indirect printing, the colour paste being printed by means of inkjet technology, which method is characterised in that the colour paste, which contains at least 30 wt. % inorganic solids from the group of the pigments, glass frits and other glass-forming components, is applied to the surface of the material to be decorated or to a transfer material by means of a heatable inkjet print head, the temperature of which is kept above the melting point of the colour paste. The dependent claims relate to preferred embodiments and to those methods which are directed towards the decoration of materials which can be fired for the purpose of decoration.

Surprisingly, molten thermoplastic colour pastes, such as are used for decorating container glass, and accordingly have a very high content of inorganic solids, namely glass colours, exhibit virtually no settling out. Once the heating in the inkjet print head and/or in the supply element of the inkjet printing device has been switched off, the thermoplastic colour paste solidifies immediately, so that no sedimentation occurs even in the case of a long standing time.

The thermoplastic medium generally has a melting point in the range of from 30 to 100° C., preferably from 40 to 80° C. and especially from 45 to 60° C. It was not foreseeable that thermoplastic colour pastes having a content of over 30 wt. % inorganic solids could be printed by means of inkjet technology without problems. Thermoplastic colours such as are to be used for the decoration of ceramic articles preferably contain over 50 wt. % inorganic solids.

Underglaze colours advantageously contain colour powders, that is to say mixtures of one or more inorganic pigments and a glass flux, in an amount of approximately from 65 to 75 wt. %, enamel, stoneware and porcelain colours in an amount in the range of from 70 to 80 wt. % and glass colours in the range of from 80 to 90 wt. %.

The thermoplastic colour pastes (that term is kept even though a pasty to liquid state of the colour pastes is not achieved until they have been melted) to be used according to the invention can contain one or more inorganic pigments of any desired structure and any desired chemical composition. For ceramics purposes, pigments which are substantially stable under the firing conditions are used. In addition to the pigments, the thermoplastic colour pastes may also contain glass frits or a combination of substances which fuse together under the firing conditions to form a glass. The glass-forming components are those which are known from glazing compositions, especially transparent glazing compositions. For the decoration of ceramics, the thermoplastic colour paste usually contains, in addition to the thermoplastic medium, a ceramics decorative colour, the person skilled in the art understanding by that expression a finely powdered mixture of silicate-like glasses (fluxes) and temperature-stable pigments. The production of decorative colours generally comprises grinding a mixture of the pigment(s) and the component(s) of the glass flux together.

The thermoplastic medium of the colour paste can contain one or more monomeric, oligomeric or polymeric compounds. Especially advantageous monomeric or, optionally, oligomeric compounds, which generally constitute the main constituent of the thermoplastic medium, are paraffins, fatty alcohols, fatty acids, fatty acid esters and fatty acid amides. In general, those compounds contain at least one aliphatic radical having at least 10 carbon atoms, preferably from 12 to 30 carbon atoms. Special preference is given to fatty alcohols having from 12 to 18 carbon atoms. As an alternative or in addition to the above-mentioned classes of substances, the thermoplastic medium may contain one or more polymeric or copolymeric compounds from the group of the polyolefins, polyoxyalkylenes, polyamides, polyesters, acrylate and methacrylate resins, natural resins and cellulose derivatives. According to a further alternative, the thermoplastic medium contains a combination of one or more of the aliphatic compounds and one or more of the polymeric compounds. According to an especially preferred embodiment, the thermoplastic medium contains one or more compounds from the group of the fatty alcohols, paraffins, hardened fats or polyoxyethylenes having a molecular weight of at least 10,000 as the main component and one or more compounds from the group of modified colophonium resins, methacrylate resins and cellulose derivatives, such as methylated, ethylated or carboxymethylated celluloses, as the subsidiary component.

A protective layer of a glass-forming material can additionally be applied to the decoration which has been printed onto the surface to be decorated or onto a suitable transfer material by means of an inkjet printing process. The glass-forming layer can likewise be applied by means of the inkjet method, or by means of another conventional method of producing protective layers. A protective layer is advantageous especially in the production of ceramics decorations, when the actual decoration is to be protected from external influences.

As has already been stated, it is also possible to use the method according to the invention to produce a transfer material, carrying the decoration, for indirect printing. The decorative layer applied to a transfer material, which is generally provided with a separating layer, or a combination of a decorative layer and a protective layer as well as a conventional organic film layer applied thereover, can be transferred to the surface of the material to be decorated by means of transfer, usually wet-stripping, by means of heat release or a conventional transfer printing process, for example a pad transfer printing process.

For printing the thermoplastic colour paste there are suitable conventional inkjet printers having a device for heating the inkjet print head. Advantageously, the inkjet print head is connected to a supply element, the supply element also being heated. In order to rule out sedimentation problems, it is advantageous to connect the print head and the supply element in such a manner that the molten colour paste can be circulated between the print head and the supply element. Accordingly, a preferred device for the inkjet printing of thermoplastic colour pastes having a high content of inorganic solids comprises an inkjet print head, a colour container and a hose pump; these elements are connected with one another in a loop and are under excess pressure, for example from 1 to 5 bar, during operation. The print head usually comprises a cube-shaped cavity (inkjet cell). One or more bores are arranged on the underside of the print head to form the print nozzles. The print nozzles are closed and opened from the inside by means of rubber plungers which are moved electromechanically (electromechanical unit). The colour paste is pumped into the print head from the side from a storage container, and the colour paste flows back into the colour container through a further opening.

The FIGURE shows a cross-section through an inkjet cell 1, the valve plunger 5 of which is shown in the closed position. A plurality of inkjet cells connected together in the manner of a bundle form the actual print head of the inkjet printing device. The cell comprises a base body 2, a nozzle 3, arranged in the base region, having the nozzle opening 4, the valve plunger 5 and a piezoelectric unit 6 permitting the to and fro movement of the plunger. The chamber 7 of the inkjet cell communicates via a channel 9 with a space 8 for supplying one or more inkjet cells with colour paste. The side wall 10 of the base body 2 contains a connection piece 11 for supplying the colour paste and a connection piece 12 for removing the same. The connection piece 11 is connected to a pump (not shown), and the connection piece 12 is connected to a supply element (also not shown), usually a storage container. To complete the loop, the pump and the supply element are connected to one another via a line (not shown). For melting the thermoplastic colour paste in the inkjet cell, the base body 2 is connected to a heating element 13, so that the colour paste in the chamber 7 and in the space 8 is in the pasty to liquid state. Advantageously, the supply element also contains a heating device.

For printing, the object to be printed is advantageously placed on an X-Y table beneath the print head. A control unit controls the opening and closing of the nozzles as well as the movement of the table containing the object to be printed. The object to be printed is at a distance of approximately 1 cm from the nozzle openings of the inkjet print head, and the colour paste emerging in drop form is placed accurately and thereby solidifies. It is also possible to keep the object to be decorated stationary and to arrange the inkjet print head to be movable.

In so far as a material which can be fired for the purpose of decoration has been printed directly or indirectly, the printing, or the transfer of the print image from a carrier to the object to be decorated, is followed in a known manner by firing. In the decoration of glass objects, the firing temperature is usually from 500 to 650° C. An overglazing decoration is usually fired at from 700 to 900° C., and an inglaze decoration is usually fired at a temperature of over 1100° C.

The fundamental advantage of the invention is that the inkjet printing process can also be used for colours that have a high content of inorganic constituents. As a result, inkjet technology can also be used for the production of ceramics decorations. The invention is explained further with reference to the following Examples.

EXAMPLES

An installation comprising an inkjet print head, a colour container, a hose pump, an X-Y table and a control unit was used for the printing. The inkjet print head, the colour container and the hose pump were connected to one another in the form described above, so that molten colour paste could be circulated. The colour container was placed under a pressure of 0.4 MPa by means of compressed air. The print head contained eight bores in a line and accordingly also had eight piezoelectric elements. Both the print head and the colour container were equipped with a heating device.

The medium used in the Examples consisted of 85 wt. % cetyl alcohol, 6 wt. % ethylcellulose (Ethocel 20 cP, Dow Chemical) and 9 wt. % modified colophonium resin (Stybelite Ester 5, Herkules Powder). The thermoplastic medium solidifies at 52° C.

Colour pastes: Glass colours were made into a paste with the mentioned medium in a ratio of 85 wt. % colour powder to 15 wt. % medium. Enamel, stoneware and porcelain colours were made into a paste with the medium in a ratio of from 75 to 85 wt. % colour powder to from 20 to 25 wt. % medium. Underglazing colours were made into a paste with the medium in a ratio of 70 wt. % colour powder to 30 wt. % medium.

The model used for printing was a black-and-white photograph. It was digitised in a frequency-modulated manner by means of a computer program for producing models for screen printing. The bit-map data was used to control the inkjet print head and the X-Y table. The colour paste solidified immediately on the surface and was fast to handling. Printing was carried out linearly.

The colour pastes, which are solid at room temperature, were used in the above-described inkjet printing device for the direct decoration of glass, enamel, stoneware and porcelain. The printed objects were fired at a suitable firing temperature for the particular material. Good printing results were achieved.

The test installation was set up for only one colour. By repeating the printing operation four times using four different colours—blue, crimson, yellow and black—a four-colour print was produced. The model used for printing was a photograph, from which colour separations were produced using the computer-assisted colour separation process CerDeChrom® (Cerdec AG and Color Solutions Inc.). Those four bit-maps were used to control application of the colours.

For indirect printing, transfers were produced: lightweight cardboard, which was coated with a water-soluble layer on one side, was printed by means of the inkjet device and the above-described thermoplastic colour pastes. The printing was provided with a protective film in the conventional manner. The image was transferred to the object to be decorated without problems and was fired. Good printing results were also achieved in that indirect printing process.

What is claimed is:

1. A method of decorating a hard material, comprising applying to a surface of the material to be decorated a decorative layer comprised of a thermoplastic color paste, the thermoplastic color paste comprising at least 30 wt. % of inorganic solids selected from the group consisting of pigments, glass frits and other glass-forming components in a thermoplastic medium having a melting point of at least 30° C., the thermoplastic color paste being applied directly to the surface of the material to be decorated or indirectly using a transfer material, the thermoplastic color paste being applied by inkjet printing using a heatable inkjet print head, the temperature of the print head being kept above the melting point of the thermoplastic color paste.

2. The method according to claim 1, wherein the thermoplastic medium melts in a range of from 30 to 100° C.

3. The method according to claim 1, wherein the thermoplastic color paste has a content of over 50 wt. % inorganic solids.

4. The method according to claim 1, wherein the thermoplastic medium is selected from (i) one or more compounds selected from the group consisting of the paraffins, fatty alcohols, fatty acids, fatty acid esters and fatty acid amides, or (ii) one or more polymeric or copolymeric compounds selected from the group consisting of the polyolefins, polyoxyalkylenes, polyamides, polyesters, acrylate and methacrylate resins, natural resins and cellulose derivatives, or (iii) one or more compounds from each of the groups (i) and (ii).

5. The method according to claim 1, wherein the thermoplastic medium contains one or more compounds selected from the group consisting of fatty alcohols, paraffins, hardened fats or polyoxyethylenes having a molecular weight of at least 10,000 as a main component and one or more compounds selected from the group consisting of modified colophonium resins, methacrylate resins and methylated, ethylated or carboxymethylated cellulose as a subsidiary component.

6. The method according to claim 1, wherein the thermoplastic color paste comprises from 10 to 40 wt. % thermoplastic medium and from 90 to 60 wt. % inorganic solids selected from the group consisting of pigments, glass frits and glass fluxes.

7. The method according to claim 1, wherein the decorative layer is applied to a transfer material, which layer may additionally contain a protective layer, and which layer is applied to the surface of the material to be decorated by means of a wet-stripping transfer, a heat-release or transfer printing.

8. The method according to claim 1, wherein the thermoplastic color paste is pumped between the inkjet print head and a heatable supply element connected thereto, at a temperature above the melting point of the medium, in order to avoid sedimentation.

9. The method according to claim 1, wherein the heatable inkjet print head has from 8 to 24 individually controllable nozzle openings, a supply element for the color paste is arranged in a stationary manner, the surface of the material to be printed is arranged to be movable in the X and/or Y direction, and the decoration is formed by computer-controlled opening and closing of the nozzle openings and movement of the surface to be printed in the X and/or Y direction.

10. The method according to claim 1, wherein the surface of a material which can be fired for the purpose of decoration is printed directly or indirectly using a thermoplastic color paste containing at least one ceramics decorative color, and the decorative layer is fired at a temperature in the range of from 500 to 1400° C.

11. The method according to claim 1, wherein the surface of the material to be decorated is glass, porcelain, ceramics, enamel or a metal object.

12. The method according to claim 7, wherein the protective layer is applied to the decorative layer of the thermoplastic color paste, the protective layer containing a material that forms a glassy layer on firing.

13. The method according to claim 1, wherein the color paste is applied to the surface of the material to be decorated or to the transfer material by means of a printing device containing a heatable inkjet print head, a supply element connected thereto and a device for circulating the molten color between the print head and the supply element.

14. The method according to claim 1, wherein the thermoplastic medium melts in a range of 45 to 60° C.

15. The method according to claim 1, wherein the thermoplastic color paste contains a ceramic decoration color.

* * * * *